(12) United States Patent
Cosquer et al.

(10) Patent No.: US 7,743,421 B2
(45) Date of Patent: Jun. 22, 2010

(54) COMMUNICATION NETWORK SECURITY RISK EXPOSURE MANAGEMENT SYSTEMS AND METHODS

(75) Inventors: Francois J. N. Cosquer, Orgeval (CA); Bertrand Marquet, Le Plessis Robinson (CA); Robert W. MacIntosh, Carp (CA); Yvon Leclerc, Ottawa (CA); Scott David D'Souza, Ottawa (CA)

(73) Assignee: Alcatel Lucent, Paris (FR)

( * ) Notice: Subject to any disclaimer, the term of this patent is extended or adjusted under 35 U.S.C. 154(b) by 1160 days.

(21) Appl. No.: 11/132,118

(22) Filed: May 18, 2005

(65) Prior Publication Data

US 2006/0265751 A1 Nov. 23, 2006

(51) Int. Cl.
G06F 21/00 (2006.01)
G06F 15/16 (2006.01)
G06F 11/30 (2006.01)

(52) U.S. Cl. .................... 726/25; 709/224
(58) Field of Classification Search ............... None
See application file for complete search history.

(56) References Cited

U.S. PATENT DOCUMENTS

| | | | |
|---|---|---|---|
| 5,751,965 A | 5/1998 | Mayo et al. | |
| 6,125,453 A | 9/2000 | Wyss | |
| 6,282,546 B1 * | 8/2001 | Gleichauf et al. | 707/102 |
| 6,298,445 B1 * | 10/2001 | Shostack et al. | 726/25 |
| 6,301,668 B1 * | 10/2001 | Gleichauf et al. | 726/25 |
| 6,321,338 B1 * | 11/2001 | Porras et al. | 726/25 |
| 6,535,227 B1 | 3/2003 | Fox et al. | |
| 6,883,101 B1 | 4/2005 | Fox et al. | |
| 6,895,383 B2 | 5/2005 | Heinrich | |
| 6,907,531 B1 * | 6/2005 | Dodd et al. | 726/25 |
| 7,152,105 B2 * | 12/2006 | McClure et al. | 709/224 |

(Continued)

FOREIGN PATENT DOCUMENTS

WO WO 01/60024 A2 8/2001

(Continued)

OTHER PUBLICATIONS

International Standard, "Information technology—Security techniques—Evaluation criteria for IT security—Part 1: Introduction and general model," ISO/IEC 15408-1:1999(E), First Edition Dec. 1, 1999.

(Continued)

Primary Examiner—Christopher A Revak
(74) Attorney, Agent, or Firm—Eckert Seamans Cherin & Mellott, LLC; Kirk D. Houser, Esq.

(57) ABSTRACT

Communication network security risk exposure management systems and methods are disclosed. Risks to a communication network are determined by analyzing assets of the communication network and vulnerabilities affecting the assets. Assets may include physical assets such as equipment or logical assets such as software or data. Risk analysis may be adapted to assess risks to a particular feature of a communication network by analyzing assets of the communication network which are associated with that feature and one or more of vulnerabilities which affect the feature and vulnerabilities which affect the assets associated with the feature. A feature may be an asset itself or a function or service offered in the network and supported by particular assets, for example.

20 Claims, 8 Drawing Sheets

U.S. PATENT DOCUMENTS

| | | | |
|---|---|---|---|
| 7,243,148 B2* | 7/2007 | Keir et al. | 709/224 |
| 7,257,630 B2* | 8/2007 | Cole et al. | 709/224 |
| 7,376,969 B1 | 5/2008 | Njemanze et al. | |
| 7,451,488 B2 | 11/2008 | Cooper et al. | |
| 2002/0078381 A1 | 6/2002 | Farley et al. | |
| 2002/0138416 A1 | 9/2002 | Lovejoy et al. | |
| 2002/0199122 A1 | 12/2002 | Davis et al. | |
| 2003/0046582 A1 | 3/2003 | Black et al. | |
| 2003/0097588 A1 | 5/2003 | Fischman et al. | |
| 2003/0126472 A1 | 7/2003 | Banzhof | |
| 2003/0154269 A1 | 8/2003 | Nyanchama et al. | |
| 2003/0154404 A1 | 8/2003 | Beadles et al. | |
| 2004/0102922 A1 | 5/2004 | Tracy et al. | |
| 2004/0143753 A1 | 7/2004 | Hernacki et al. | |
| 2004/0168086 A1 | 8/2004 | Young et al. | |
| 2004/0221176 A1* | 11/2004 | Cole | 713/201 |
| 2005/0010821 A1 | 1/2005 | Cooper et al. | |
| 2005/0022021 A1 | 1/2005 | Bardsley et al. | |
| 2005/0039046 A1 | 2/2005 | Bardsley et al. | |
| 2005/0091542 A1* | 4/2005 | Banzhof | 713/201 |
| 2005/0114186 A1 | 5/2005 | Heinrich | |
| 2005/0193430 A1 | 9/2005 | Cohen et al. | |
| 2006/0021044 A1 | 1/2006 | Cook | |
| 2006/0156407 A1 | 7/2006 | Cummins | |
| 2007/0016955 A1 | 1/2007 | Goldberg et al. | |
| 2007/0067847 A1* | 3/2007 | Wiemer et al. | 726/25 |
| 2009/0076969 A1* | 3/2009 | Sparks | 705/80 |

FOREIGN PATENT DOCUMENTS

WO    WO 02/054325 A    7/2002

OTHER PUBLICATIONS

Young-Hwan Bang, Yoonn-Jung Jung, Injung Kim, Namhoon Lee, Gang-Soo Lee: "The Design and Development for Risk Analysis Automatic Tool" Online. [Online] 2004, pp. 491-499. XP002400108 Retrieved from the Internet: URL:http://springerlink.metapress.com/content/1a5017n9txrumuur/fulltext.pdf> *whole document*.

Wu W et al: "Integrated Vulnerability Management System for Enterprise Networks" E-Technology, E-Commerce and E-Service, 2005. EEE '05. Proceedings. The 2005 IEEE International Conference on Hong Kong, China 29-01 Mar. 2005, Piscataway. NJ. USA, IEEE. Mar. 29, 2005 *whole document*.

Jansen A et al: "Adopting Internet-Centric Technologies in Network Management: The Internet has spawned a number of new technologies which are increasingly being used to enhance network and service management" Alcatel Telecommunications Review, Alcatel, Paris Cedex, FR, Jul. 2003 XP007005936 ISSN: 1267-7167 *p. 5*.

Farahmand et al., Managing Vulnerabilities of Information Systems to Security Incidents, ICEC 2003, ACM 1-58113, pp. 348-354.

Apostolakis, G.E. et al., "A Screening Methodology for the Identification and Ranking of Infrastructure Vulnerabilities Due to Terrorism", XP-002457051, Risk Analysis, vol. 25, No. 2, 2005, pp. 361-376.

Schiffman, M., "The Common Vulnerability Scoring System", XP-002479898, The RSA Conference, Feb. 2005, 41 pp.

Baybutt, Cyber Security Vulnerability Analysis: An Asset-based approach, Dec. 2003, Process Safety Progress, vol. 22, No. 4, pp. 220-228.

Polepeddi, S., "Software Vulnerability Taxonomy Consolidation", XP-002457428, UCRL-TH-208822, Jan. 4, 2005, 41 pp.

Böhme, R., "A Comparison of Market Approaches to Software Vulnerability Disclosure," Emerging Trends in Information and Communication Security Lecture Notes in Computer Science; LNCS, Springer-Verlag, BE, vol. 3995, 2006, pp. 298-311.

Ferson, S., "Fuzzy arithmetic in risk analysis". Available at http://web.archive.org/web/20030822232721/www.ramas.com/fuzzygood.ppt/www.ramas.com/fuzzygood.ppt. Downloaded Sep. 17, 2009, Aug. 2003, 30 pp.

Stamatelatos, G., "New Thrust for Probabilistic Risk Assessment (PRA) at NASA; Risk Analysis for Aerospace Systems II: Mission Success Starts with Safety". Available at http://www.sra.org/docs/Stamatelatos.pdf. Downloaded Sep. 17, 2009, Oct. 28, 2002, pp. 1-45.

Hayden, B. et al., "On the Generation of Short Paths and Minimal Cutsets of the Hierarchical Web Graph". Available at http://dimax.rutgers.edu/~ehavden/REU%20all1.pdf. Downloaded Sep. 17, 2009, Jul. 21, 2005, pp. 1-8.

Fleming, R., "Vulnerability Assessment Using a Fuzzy Logic Based Method". Available at http://handle.dtic.mil/100.2/ADA274075. Downloaded Sep. 17, 2009, Dec. 7, 1993, 101 pp.

Karas, W., C++AVL Tree Template Version 1.3, http://www.geocities.com/wkaras/gen_cpp/avl_tree.html?200522, Aug. 22, 2005, pp. 1-12.

Maggio, "Space Shuttle Probabilistic Risk Assessment: Methodology & Application", 1996 Proceedings Annual Reliability and Maintainability Symposium, Jan. 25, 1996, pp. 121-132.

Hong et al., "Efficient enumeration of all minimal separators in a graph", Theoretical Computer Science, vol. 180, No. 1-2, Jun. 10, 1997, pp. 169-180, Australia.

Kloks et al., "Finding all minimal separators in a graph", Proceedings of 11$^{th}$ Symposium of Theoretical Aspects of Computer Science, Feb. 1994, pp. 759-768, Berlin.

Littlewood, B., Broclehurst, S., Fenton, N., Mellor, P., Page, S., Wright, D., Dobson, J., McDermid, J., and Gollman, D., Towards Operational Measures of Computer Security. J. Comput. Sec. 2, 2. Available at http://www.csr.city.ac.uk/people/bev.littlewood/bl_public_papers/Measurement_of_security/Quantitative_security.pdf. Downloaded Sep. 17, 2009, 1993, pp. 1-24.

"Common Criteria International Standard ISO/IEC 15408:1999". Available at http://www.niap-ccevs.org/cc-scheme/cc_docs/cc_v21_part1.pdf. Downloaded Sep. 17, 2009, Aug. 1999, 61 pp.

* cited by examiner

130

| VULNERABILITY IDENTIFIER 132 | VULNERABILITY DESCRIPTION 134 |
|---|---|

| ASSET IDENTIFIER 142 | ASSET TYPE 144 | ASSET VALUE 146 | ASSET PROFILE 148 |
|---|---|---|---|

| ASSET/ FEATURE IDENTIFIER 141 | DIRECT EXPOSURE INFORMATION 143 | INDIRECT EXPOSURE INFORMATION 145 | TOTAL EXPOSURE INFORMATION 147 | RISK INFORMATION 149 |
|---|---|---|---|---|

FIG. 7C

COMMUNICATION NETWORK SECURITY RISK EXPOSURE MANAGEMENT SYSTEMS AND METHODS

CROSS-REFERENCE TO RELATED APPLICATION

The present application is related to U.S. patent application Ser. No. 11/131,598, entitled "SECURITY RISK ANALYSIS SYSTEMS AND METHODS", and filed of even date herewith. The entire contents of the above-identified application are incorporated into the present application by reference.

FIELD OF THE INVENTION

This invention relates generally to communication network security, and in particular, to managing security risks to assets in a communication network.

BACKGROUND

In complex systems such as telecommunications and Information Technology (IT) infrastructures, the potential impacts of security vulnerabilities, even if discovered and disclosed, tend to be difficult to assess in a timely fashion. This is primarily due to the number and nature of these vulnerabilities, as well as the number of assets in such systems. Some assets may also have embedded software layers and other dependencies, which further complicates security assessments.

The capacity to understand and make informed decisions soon after a vulnerability is disclosed is one key aspect of proactive security. Such capacity allows network operators, for example, to understand the security state, i.e., the risk to a network infrastructure, at any given time and assign a priority action list for risk mitigation. Identification of commercial risks associated with relying on data stored and transmitted on network segments during a period of elevated security risk may also be of use in performing a comprehensive security assessment.

Despite an ever increasing number of security event management systems, however, there is no currently available solution which offers the functionality of consolidating risk impacts at the network and/or service levels.

In the area of risk calculation, currently available solutions are further deficient in that they use proprietary and fixed risk calculation formulas. These formulas are based on various fixed assumptions which typically include, among others, assumptions relating to network topology (mesh, star, etc.), data (modeling, availability, uncertainty, and type such as qualitative or quantitative), organization type (military, government, business, etc.), and variables (threat, vulnerability, asset value, attack paths). Outputs provided by such formulas also tend not to reflect the current complexity of security.

Thus, there remains a need for more comprehensive and flexible security assessment and management tools.

SUMMARY OF THE INVENTION

Embodiments of the invention relate to systems and methods for analyzing security vulnerabilities of a communication network to provide an assessment of risk to network assets. In accordance with aspects of the invention, the ability to consider services and mission level issues, and a more flexible security model are provided, to enable a more realistic risk assessment to be made in complex, large scale systems such as communication networks.

According to one aspect of the invention, there is provided a risk analyzer configured to determine risks to a communication network by analyzing assets of the communication network and vulnerabilities affecting the assets.

The assets may include physical assets such as equipment in the communication network and/or logical assets such as software for execution by processors in the communication network and information stored by equipment in the communication network.

In some embodiments, the risk analyzer is implemented in a communication network security risk exposure management system.

The risk exposure management system may also include one or more of an event manager configured to receive information associated with vulnerabilities and assets, and to update current vulnerabilities and assets based on the received information, a network model manager configured to capture a representation of the communication network and the determined risks, and a report manager configured to receive risk report selection inputs and to generate a report of the determined risks in accordance with the received selection inputs.

In some embodiments, the system includes a user interface operatively coupled to the risk analyzer. The user interface may include one or more of a simulation interface configured to receive information associated with temporary changes to the vulnerabilities, assets, or both, a configuration interface configured to receive one or more of network configuration information associated with vulnerabilities, assets, or both, and risk analysis configuration information for configuring an analysis process applied to the vulnerabilities and assets by the risk analyzer, a network map configured to present a representation of the communication network and the determined risks, and a report interface configured to receive risk report selection inputs for configuring a report of the determined risks.

A risk exposure management system may also include a data system which provides access to risk exposure management information. Such a data system may provide access to one or more of a vulnerabilities database configured to store information associated with the vulnerabilities, an asset database configured to store information associated with the assets, a security state database configured to store information associated with the determined risks, and a user interface database configured to store information associated with a user interface through which a user interacts with the system.

In accordance with another aspect of the invention, a communication network security risk analysis method is provided. The method includes providing vulnerabilities affecting assets of a communication network, such as by accessing stored vulnerabilities information or otherwise determining vulnerabilities information, and analyzing the vulnerabilities and assets to determine risks to the communication network.

The method may also include receiving information associated with vulnerabilities and assets, and updating current vulnerabilities and assets based on the received information.

In another embodiment, the method includes operations of receiving risk analysis configuration information, and adapting an analysis process applied to the vulnerabilities and assets in accordance with the received risk analysis configuration information.

Embodiments of the invention may provide different ways of performing these operations and include further operations, some of which have been described above.

A risk analyzer, in accordance with another aspect of the invention, is configured to determine risks to a feature of a communication network by analyzing assets of the communication network which are associated with the communication network feature and one or more of: vulnerabilities which affect the communication network feature and vulnerabilities which affect the assets associated with the communication network feature.

The risk analyzer may be implemented in a communication network security risk exposure management system which also includes a user interface operatively coupled to the risk analyzer and configured to receive from a user risk analysis configuration information specifying the communication network feature. The risk analyzer may be further configured to provide through the user interface an indication of the determined risks.

A related communication network security risk analysis method involves providing one or more of: vulnerabilities which affect a feature of a communication network and vulnerabilities which affect assets of the communication network associated with the feature, and determining risks to the communication network feature by analyzing the vulnerabilities and the assets.

Other aspects and features of the present invention will become apparent to those ordinarily skilled in the art upon review of the following description of specific illustrative embodiments thereof.

BRIEF DESCRIPTION OF THE DRAWINGS

Examples of embodiments of the invention will now be described in greater detail with reference to the accompanying drawings, in which:

FIGS. 7A, 7B, and 7C are block diagrams of vulnerability, asset, and security state data structures, respectively;

DETAILED DESCRIPTION OF PREFERRED EMBODIMENTS

Figure 1:
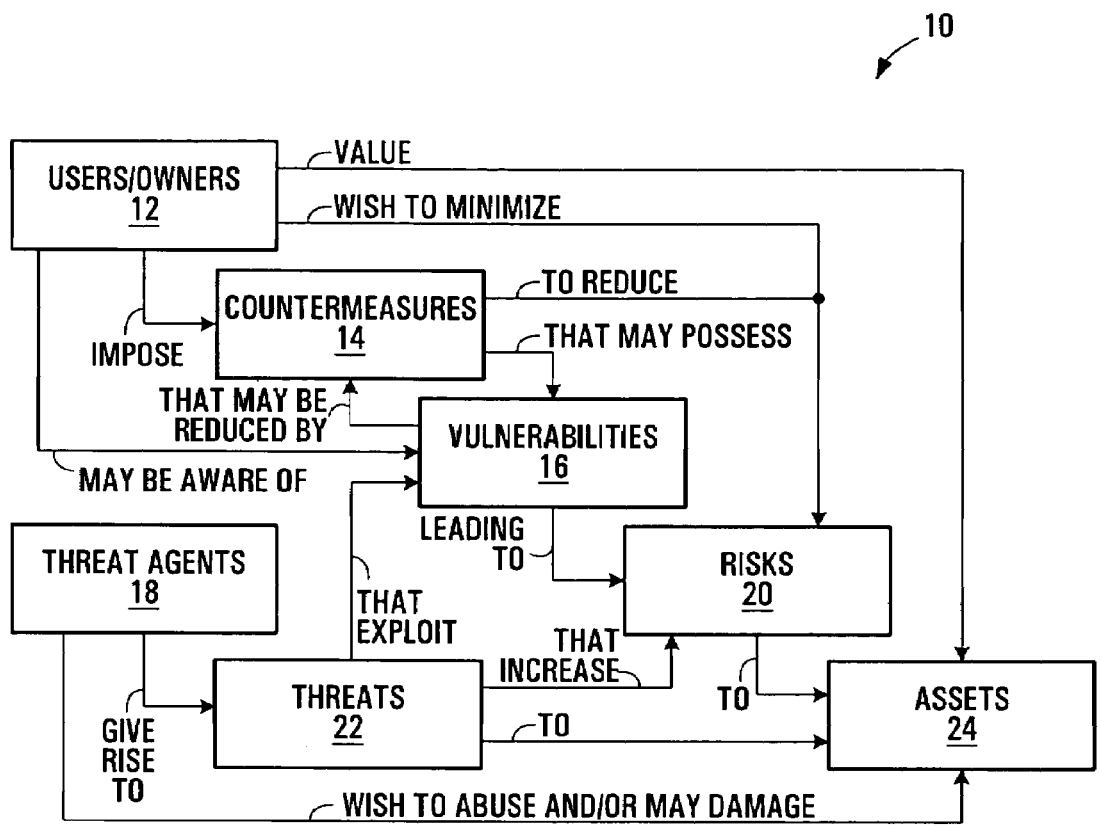
FIG. 1 is a block diagram representation of general security concepts.

As described briefly above, no currently available security assessment and management tools provide for a complete and comprehensive assessment of security, especially for complex systems such as communication networks.

For example, four classes of system may be identified as providing partial solutions to security and vulnerability management in a network infrastructure. These classes include network vulnerability scanners, intrusion detection/prevention systems, security event/information systems, and exposure risk management systems.

Of these classes, the exposure risk management systems class includes the most extensive tools. A risk management system might provide, for example, a view of a network, including scanners data and vulnerability data on an element-by-element basis for network elements such as firewalls and routers, servers, and other hosts. Typically, each element is scanned or otherwise assessed, on its own, to determine its vulnerabilities. Visual maps of an enterprise network, business applications, and potential security problems give security personnel an overview of infrastructure security for each individual element and enables drill-down capabilities for more detailed views relating to specific elements.

A form of business risk may be calculated by assessing both the likelihood of an attack and damage potential as measured by business impact variables. Risk factors might be determined at a detailed level, taking into account various attack scenarios and vulnerability.

However, currently known tools cannot address the scope of large telecommunications systems and do not address services and "missions" level issues. These tools cannot provide a realistic view for a complex network or take into account different groups or assets in order to model a given service or mission.

In addition, business risk calculations use attack likelihood based on path determination, i.e., determining a chain of vulnerabilities and assets used to complete an attack. In a large and complex network it is extremely difficult, and thus impractical if not effectively impossible, to determine an attack path for every possible attack and therefore its likelihood.

Reducing risk calculation to a specific attack path in this manner may be more efficient for a particular vulnerability or combination of vulnerabilities, but could lead to misunderstanding of a more complex situation. This simplification could effectively cause an operator or other personnel to minimize the actual risk, which could have a huge impact on the overall assessment of the security state of a network. What is more important is to provide the possibility to integrate some additional methods or formulas into a risk calculation to address more realistically the likelihood of an attack, which is not inherent in currently known tools.

Embodiments of the invention provide advanced risk exposure management techniques. A flexible security model provides a flexible asset representation model for mission- and/or service-specific assets deployed in a communication network as well as physical/logical topology of the network. A fully customizable and flexible exposure risk calculation may also be provided in some embodiments to take into account general security methodologies as well an extension scheme which accounts for specific commercial business risk.

FIG. 1 is a block diagram representation of general security concepts. The representation 10 shown in FIG. 1 illustrates an underlying security paradigm and derived concept based on the Common Criteria International Standard ISO/IEC 15408: 1999 for Information Technology Security Evaluation.

FIG. 1 shows users or owners 12, countermeasures 14, vulnerabilities 16, threat agents 18, threats 22, risks 20, and assets 24. Those skilled in the art will be familiar with the general security paradigm represented in FIG. 1, which is therefore described only briefly herein.

Users/owners 12 may include, for example, owners or operators of a communication network, or other stakeholders having an interest in assets 24.

Countermeasures 14 represent actions, such as upgrading an operating system or application software on a computer system asset for instance, which may be taken to reduce vulnerabilities 16. A vulnerability 16 is a condition in an asset's operation which makes it susceptible to an attack, or possibly a failure. A security hole in operating system software is one illustrative example of a vulnerability.

Threat agents 18 are parties wishing to abuse or use assets 24 in a manner not intended by their users/owners 12. A threat 22 is an indication, illustratively a probability, that an asset 24 may be harmed.

Assets 24, in the example of a communication network, are components of the network and may be either physical or logical. Vulnerabilities 16 may exist for each type of asset 24.

As shown in FIG. 1, users/owners 12 value assets, wish to minimize risks 20 to the assets 24, and may be aware of vulnerabilities 16 which lead to risks 20 to assets 24. Vulnerabilities 16 may be reduced by the users/owners 12 by imposing countermeasures 14. Inter-relations between other concepts shown in FIG. 1 will be apparent to those skilled in the art from a review thereof.

Figure 2:
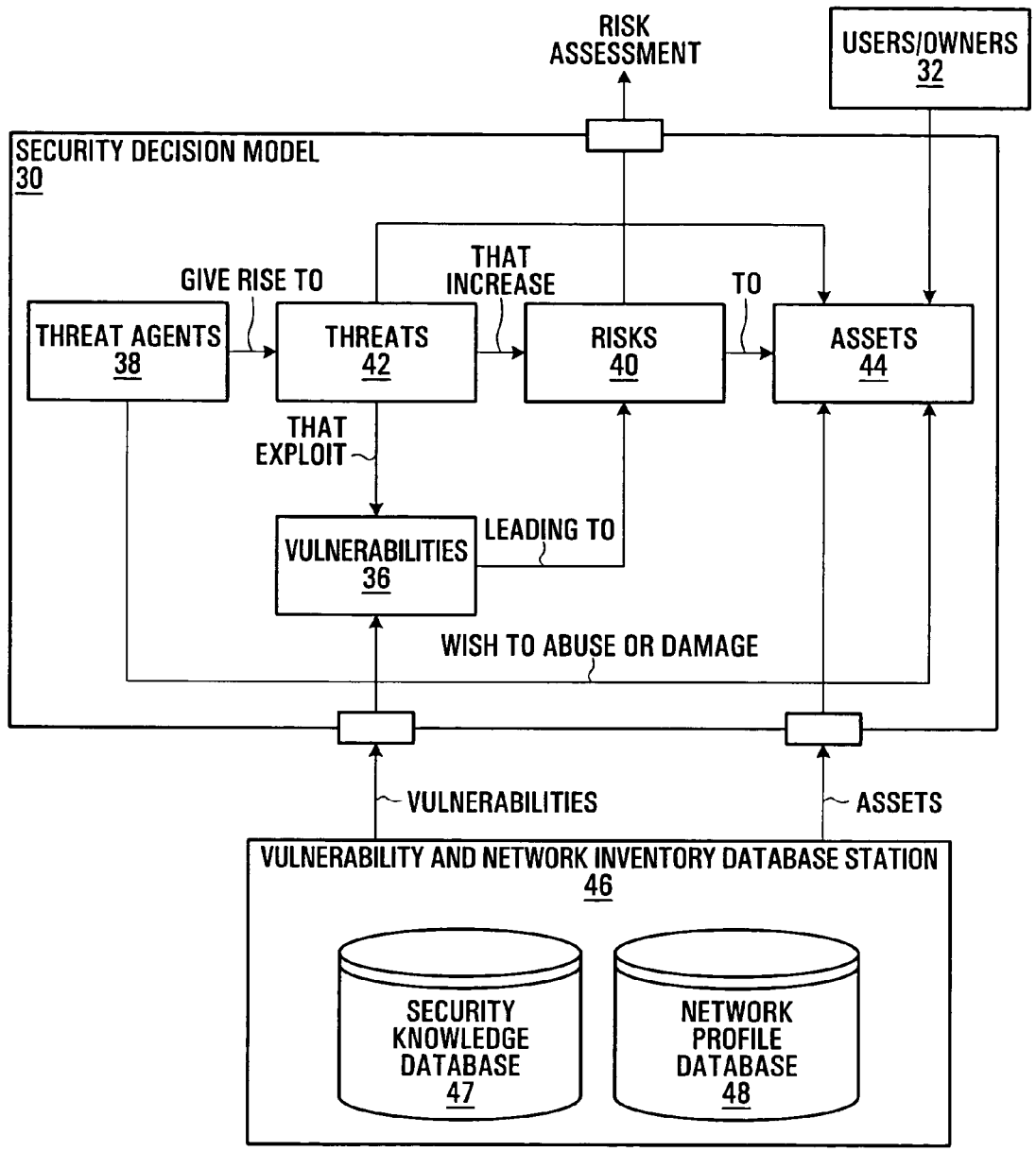
FIG. 2 is a block diagram representation of a security decision model.

An adaptation of the concepts shown in FIG. 1 and how they relate to the present invention are represented in FIG. 2, which is a block diagram representation of a security decision model of an embodiment of the invention.

The users/owners 32, threat agents 38, threats 42, risks 40, assets 44, and vulnerabilities 36 in FIG. 2 may be substantially the same as similarly labelled components of FIG. 1, but are handled differently than in conventional techniques according to embodiments of the invention.

The vulnerability and network inventory database system 46 includes databases which store either information associated with vulnerabilities and assets or information from which vulnerability and asset information may be derived. In the example shown in FIG. 2, the database system 46 includes a security knowledge database 47 which stores information associated with known vulnerabilities or security information which is converted or otherwise processed to generate vulnerability information. The network profile database 48 stores network inventory information. Information associated with assets in a network may be obtained from the network profile database 48 or derived from information which is obtained from the network profile database 48.

Various implementations of the database system 46 will be apparent to those skilled in the art. For example, any of many different types of data storage device, such as disk drives and solid state memory devices, may be used to store the databases 47, 48. According to one particular embodiment of the invention, the databases 47, 48 are stored at a computer system which also executes software implementing the security decision model 30. It should be appreciated, however, that the database system 46 is intended to more generally represent a system through which vulnerability and asset information, or information from which these can be derived, is accessible. The databases 47, 48 may thus be remote databases which are made accessible to the model 30 through appropriate interfaces and connections. The databases 47, 48 may reside at a server in a Local Area Network (LAN), for example, in which case information is accessible through a network interface and LAN connections.

In operation, the security decision model 30 takes into account assets and vulnerabilities to determine a risk assessment. The risk assessment provides an indication of current network security state to the users/owners 32.

Figure 3:
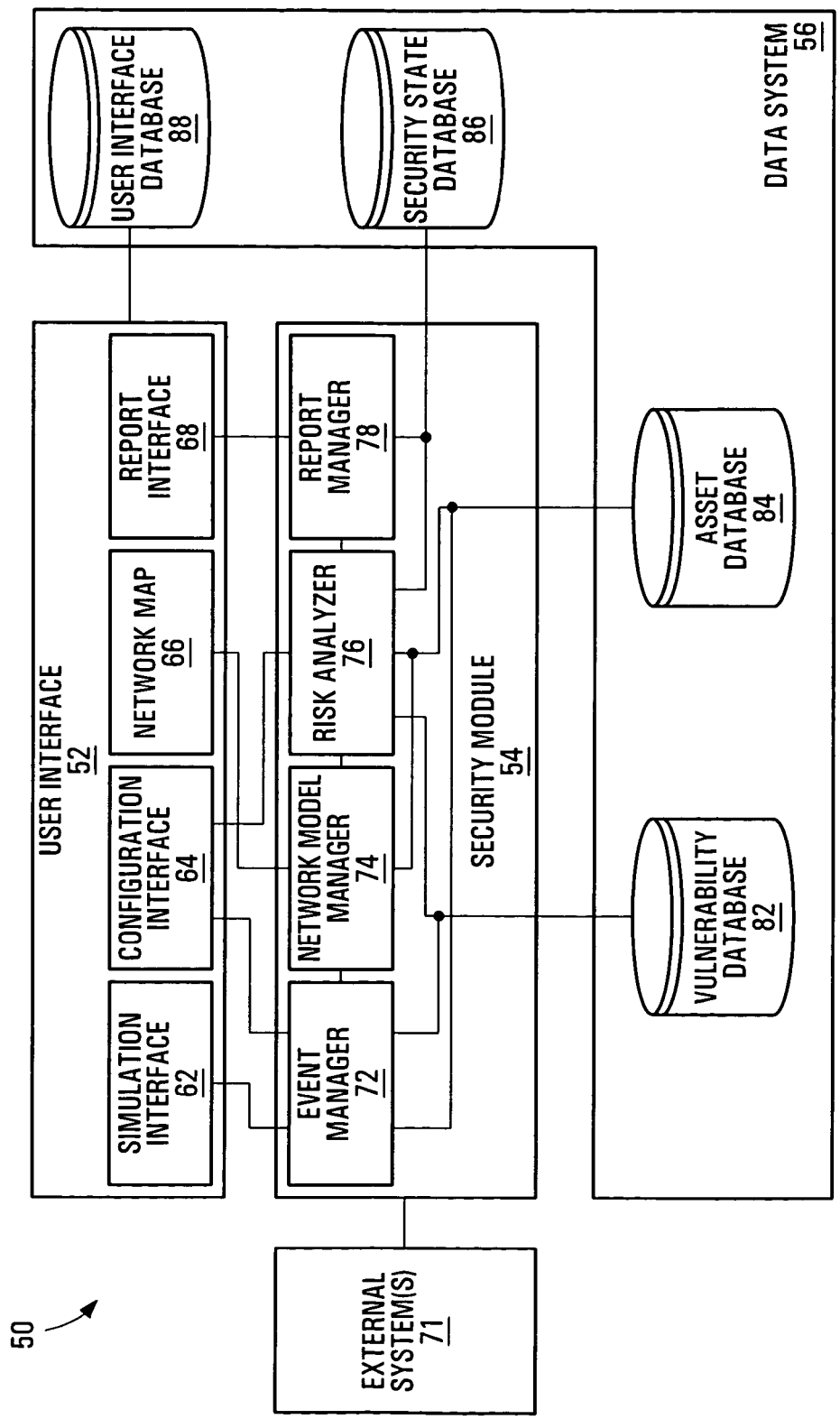
FIG. 3 is a block diagram of a security risk exposure management system.

The security decision model 30 may be implemented as shown in FIG. 3, which is a block diagram of a security risk exposure management system according to an embodiment of the invention.

The architecture of the system 50 includes three main elements, namely the user interface 52, the security module 54, and the data system 56. In one embodiment, these elements are implemented in a computer system. The user interface 52 might then be provided through a display and input devices such as a keyboard, mouse, and/or a touchscreen, the security module 54 could be implemented primarily in software for storage in a memory of the computer system and execution by a processor, and the data system 56 could include local stores, interfaces to remote stores, or some combination thereof.

It should be appreciated that embodiments of the invention may include further, fewer, or different elements, with different interconnections, than those explicitly shown in FIG. 3. For example, a security risk management system might not include every element shown in FIG. 3. A computer system or other equipment in which the system 50 or another embodiment of the invention is implemented may also include further elements used for other functions. A processor in a computer system would typically execute operating system software in addition to application software implementing security risk management functions for instance. Thus, FIG. 3, as well as the contents of the other drawings, are intended solely for illustrative purposes, and not to limit the scope of the invention.

In the particular example embodiment shown in FIG. 3, the user interface 52 includes a simulation interface 62, a configuration interface 64, a network map 66 and a report interface 68. These user interface elements 62, 64, 66, 68 interact with the security module 54 to accept user inputs and/or to provide outputs to users. A display, keyboard, mouse, and touchscreen represent examples of the types of input and output device through which information may be transferred between users and the security module 54. These elements may also have associated software components for execution by a processor to process and transfer input and output information.

The simulation interface 62, the configuration interface 64, the network map 66, and the report interface 68 are operatively coupled to the security module 54. The form of connections through which these elements interact is dependent upon the particular type of equipment in which the system 50 is implemented. Internal bus structures, for example, are often used in computer systems, and thus interactions between the user interface 52 and its components with the security module 54, as well as the data system 56, may be enabled through internal connections, drivers, and interfaces between a processor and various input/output devices. However, other types of connection may also or instead be used.

The security module 54 includes an event manager 72 which is operatively coupled to the simulation interface 62, to the configuration interface 64, to one or more external systems 71, and to the data system 56, a network model manager 74 which is operatively coupled to the network map 66, to the event manager 72, and to the data system 56, a risk analyzer 76 which is operatively coupled to the configuration interface 64, to the network model manager 74, and to the data system 56, and a report manager 78 which is operatively coupled to the risk analyzer 76, to the report interface 68, and to the data system 56. These components of the security analyzer 54, like those of the user interface 52, may be implemented in hardware, software for execution by a processor, or some combination thereof.

The data system 56 includes a vulnerability database 82 which is operatively coupled to the event manager 72 and to the risk analyzer 76, an asset database 84 which is operatively coupled to the event manager 72, to the network model manager 74, and to the risk analyzer 76, a security state database 86 which is operatively coupled to the risk analyzer 76 and to the report manager 78, and a user interface database 88 which is operatively coupled to the user interface 52. These databases may be stored in any of various types of storage device, such as solid state memory devices, disk drives, and other types of storage device which use fixed, movable, or possibly removable storage media. The data system 56 may include either data stores or interfaces through which remote data stores are accessible, as noted above in conjunction with FIG. 2. Although shown separately in FIG. 3, multiple databases 82, 84, 86, 88 may be stored in one data store or memory device.

The vulnerability database 82 stores information associated with vulnerabilities, and the asset database 84 stores information associated with assets. These databases represent examples of the databases 47, 48 (FIG. 2). Data structures which may be stored in the databases 82, 84 in accordance with embodiments of the invention are provided below.

The security state database 86 stores information associated with historical and/or current security risk status of a system. Information associated with the user interface 52, such as different network views and placement of icons which have been configured by a user, is stored in the user interface database 88.

Initial configuration of the system 50 for operation may involve storing vulnerability information and asset information in the databases 82, 84. Vulnerability and asset information may be manually entered by network operator personnel for example, and/or imported from an existing data store or other source. The databases 82, 84 may be populated through the event manager 72, as described below, or possibly a further interface (not shown) through which the databases 82, 84 are accessible.

The event manager 72 processes incoming events, such as initial network and vulnerability configuration information, introduction of a new vulnerability, or a change in the network topology or configuration. Information may be received by the event manager 72 from the simulation interface 62, the configuration interface 64, or one or more external systems 71 such as a Network Management System (NMS) of a communication network.

Through the simulation interface 62, a user may make trial or temporary changes in a network. This allows users to investigate the effects of changes, countermeasures for instance, before these changes are actually made in the network. A simulation event from the simulation interface 62 is preferably handled in a different manner than changes or updates received from other sources, so that temporary simulation changes do not affect vulnerabilities and assets which reflect actual network conditions. This may be accomplished, for example, by providing separate simulation databases to which temporary changes are applied. Simulation databases could be stored until explicitly deleted or cleared by a user, depending upon the amount of storage space available in the data system 56, or automatically deleted when a user closes or exits the simulation interface 62.

Information received by the event manager 72 from the configuration interface 64 or external system(s) 71 which affects actual vulnerabilities or network assets may be processed and written to the databases 82, 84. The nature of the processing performed by the event manager 72 may be dependent on the type, format, and/or source of the information for instance.

Information entered through the configuration interface 64 may already be formatted according to data structures used to store information in the databases 82, 84 and can be written to the databases without significant processing. In the case of information received from external systems 71, however, processing such as format and/or content conversions may be performed by the event manager 72. For example, e-mail updates including advisories of new vulnerabilities discovered by vendors of software used in a network may be received and processed by the event manager 72 and used to update the vulnerability database 82. Network equipment or configuration updates received from an NMS might involve an intermediate level of processing, generally less processing than information from other external systems 71 but possibly more processing than information from the internal configuration interface 64.

The event manager 72 may thus receive information associated with vulnerabilities and assets, and update current vulnerabilities and assets, or more specifically information in the databases 82, 84, based on the received information.

The network model manager 74 captures a representation of the network being analyzed from the event manager 72, the asset database 84, or both, to present the network map 66 to a user. Assets and their relationships, as specified in the asset database 84, are used by the network model manager 74 to build a model of the network. Events affecting a current network model may be passed from the event manager 72 to the network model manager 74, or stored in the asset database 84 for access by the network model manager 74. It should thus be appreciated that the network model manager 74 need not necessarily be operatively coupled to the event manager 72. In some embodiments, the simulation interface 62 and the configuration interface 64 may be operatively coupled to the network model manager 74 to apply changes to a model.

The risk analyzer 76 performs risk analysis and calculations. In accordance with an aspect of the invention, the risk analyzer 76 determines vulnerabilities affecting assets of a communication network, and determines risks in the communication network by analyzing the vulnerabilities and assets. Information associated with the vulnerabilities and assets is stored in the databases 82, 84 as noted above, and accessed by the risk analyzer 76.

Assets may include either or both of physical assets, illustratively equipment in the communication network, and logical assets such as software running on equipment in the communication network and information stored by equipment in the communication network.

Indications of risks determined by the risk analyzer 76 are provided to the network model manager 74, so that a representation of the communication network and the determined risks can be provided to a user through the user interface 52 in the form of the network map 66. The network map 66 thus includes both a representation of the network and detailed security risk information. Any of many different types and layouts of the network map 66 may be used to present results of a risk analysis. A graphical representation of a network in which assets and risks are shown using icons or images, text, or some combination thereof, may provide a most effective indication of a current security state of the network. In some embodiments, the format and layout of the network map 66 is in accordance with previously established user interface settings stored in the user interface database 88.

The present invention is in no way limited to any particular type of representation or output. For example, indications such as alarms or warnings, which may be provided locally through the user interface 52 or transmitted to a remote system such as a pager or an e-mail client for instance, are also contemplated.

The risk analyzer 76 may also provide security risk information to either or both of the report manager 78 and the security state database 86. In FIG. 3, the risk analyzer 76 is operatively coupled to both the report manager 78 and the security state database 86. Outputs from the risk analyzer 76 may instead be provided to the security state database 86 through the report manager 78. Another possible option would be to operatively couple the risk analyzer 76 and the report manager 78 to the security state database 86. In this case, outputs from the risk analyzer 76 are provided to the security state database 86, and information in the security state database 86 is then accessed by the report manager 78 to provide reports to a user through the report interface 68.

The report interface 68 may also receive risk report selection inputs from a user for configuring reports of the risks determined by the risk analyzer 76. Risk report selection inputs may control the content, format, or both, of reports generated by the report manager 78. Responsive to risk report selection inputs received through the report interface 68, the report manager 78 accesses security risk information, in the security state database 86 for instance, and generates a customized report for a user.

As noted above, a further advantage of the techniques disclosed herein is flexibility. Through the configuration interface 64, a user may provide network configuration information associated with vulnerabilities, assets, or both, so as to effectively change the communication network being analyzed.

The configuration interface 64 may also be used to enter risk analysis configuration information for configuring an analysis process applied to the vulnerabilities and assets by the risk analyzer 76. The risk analysis process is adapted in accordance with risk analysis configuration information provided by a user. Risk analysis adaptation may involve selecting specific types of risk calculations or parameters therefor, for example.

Embodiments of the invention also provide for selection of particular communication network features for analysis. A user may be interested in assessing risk for a specific network asset, for a specific service provided by the network, or for a specific mission which is carried out using the communication network.

Once a service, mission, or other network feature is selected, the risk analyzer 76 determines vulnerabilities which affect the selected feature or assets in the network associated with the selected feature, illustratively by accessing the databases 82, 84. The risk analyzer 76 then determines risks to the selected feature by analyzing the vulnerabilities and assets. An indication of feature-specific risks may then be provided through the network model manager 74, the report manager 78, or both.

Figure 4:
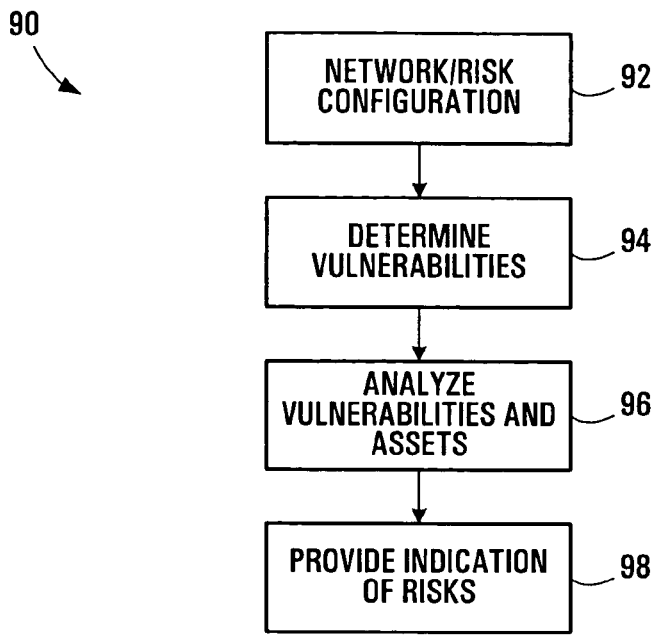
FIG. 4 is a flow diagram illustrating a security risk management method.

Embodiments of the invention have been described above primarily in the context of a system. FIG. 4 is a flow diagram illustrating a method according to an embodiment of the invention.

The method 90 begins at 92 with an operation of network and/or risk configuration. This operation may involve, for example, any or all of populating or updating vulnerability and/or asset information, selection of one or more specific network features for security risk analysis, and adaptation of a risk analysis process.

Where a specific network feature is specified at 92, vulnerabilities affecting a selected network feature and/or associated assets, or all assets where network-wide security analysis is to be performed, are determined at 94, and the vulnerabilities and assets are analyzed at 96 to determine risks in the communication network. An indication of the determined risks is provided at 98.

It should be appreciated that the method 90 is intended solely for illustrative purposes, and not to limit the scope of the invention. Embodiments of the invention may be implemented with fewer or further operations than those shown in FIG. 4, or the illustrated operations may be performed in a different order. For example, the method 90 might be repeated when network vulnerabilities and/or assets are updated or for different simulation scenarios.

Another aspect of the invention provides a risk calculation engine and associated techniques to calculate network security risk exposure. With reference to FIG. 3, analysis of assets and vulnerabilities by the risk analyzer 76 may involve the risk exposure calculations described in further detail below.

For example, according to one embodiment, the risk analyzer 76 may also take relationships between assets into consideration so as to propagate the effects of vulnerabilities and risks throughout a network. Propagation of vulnerabilities allows risk analysis to take into account vulnerabilities which affect not only a particular asset, but also those which affect other assets which have relationships with that asset. A determination of risk for the particular asset may thus be based on both its own vulnerabilities and the propagated vulnerabilities which affect related assets. Therefore, this aspect of the invention may be viewed as propagating the effects of vulnerabilities, propagating risks, or both, and references herein to propagation of vulnerabilities and risks should be interpreted accordingly.

Flexible risk calculation formulas provide substantial benefits to asset users/owners such as communication network operators or service providers. Conventional security risk management tools, as noted above, implement fixed logic into their risk assessment engines. In another embodiment, risk calculation is decomposed into calculator-based components. These calculators may be further assembled with behavior-based components. Each component may itself be customizable, to allow various implementations of risk calculation to meet requirements of different risk assessments, for users/owners or missions such as business, government, military, and public for instance.

Figure 5:
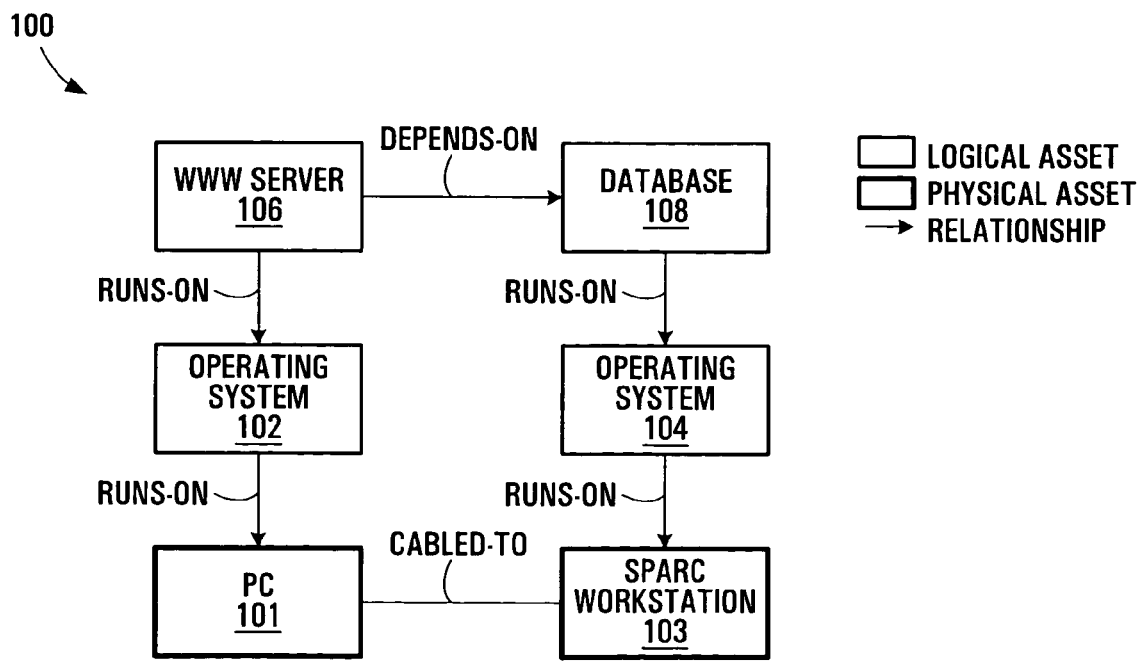
FIG. 5 is a block diagram illustrating types of assets.

In regard to risk propagation, it may be useful to first consider relationships which may exist between types of assets. FIG. 5 is a block diagram illustrating types of assets, as well as examples of how assets may be related to other assets, i.e., inter-asset relationships.

As noted above, an asset may be a physical or logical component of a communication network. In the system 100 of FIG. 5, the personal computer (PC) 101 and the SPARC workstation 103 are physical assets, and the operating systems 102, 104, the Internet (www) server 106, and the database 108 are logical assets.

Relationships between these assets are also shown in FIG. 5. A network is described by not only assets, but also the relationships between them. A relationship describes how assets are interconnected and/or their functional dependencies.

In FIG. 5, the PC 101 and the workstation 103 have a "cabled-to" relationship, indicating that these assets communicate through some sort of communication link, such as a physical connection through a communication network. The operating systems 102, 104 are executed by processors at the PC 101 and the workstation 103, and thus have a "runs-on" relationship with the PC 101 and the workstation 103, respectively.

The server 106 and the database 108 are supported by software which is also executed by processors in the PC 101 and the workstation 103. As this type of software would normally be executed by or within the operating systems 102, 104, the server 106 and the database 108 have a "runs-on" relationship with the operating systems 102, 104, respectively.

Another type of relationship is illustrated in FIG. 5 between the server 106 and the database 108. The server 106 may provide an inventory system which accesses inventory information stored in the database 108, for example. The server 106, or a function it supports, is thereby dependent upon, and thus has a "depends-on" relationship with, the database 108.

In one embodiment, relationships between assets may be represented in a two-stage manner. First, the relationship itself is represented in terms of its type, including "cabled-to", "runs-on", and "depends on" and the numbers of assets between which the particular relationship may exist. The "cabled-to" relationship in FIG. 5, for example, is of type "cabled-to", requires at least two endpoint assets. Security parameters, described in further detail below, may also be included in the specification of a relationship.

Once a relationship has been defined, the assets which are part of a particular relationship are linked to the relationship. For some types of relationship, the asset to relationship link may also indicate whether the asset is a "from" member or a "to" member of the relationship. The "from" and "to" information is used for relationships such as "runs-on", where the "from" member is the running member, and the "to" member is the member which the running member is being run on. In FIG. 5, the operating system 102 is the "from" member and the PC 101 is the "to" member of the relationship between the operating system 102 and the PC 101, as indicated by the direction of the arrow between these assets. For a "depends-on" relationship, the "from" member depends on the "to" member. For types of relationships having equivalent members, such as "cabled-to" relationships, the "from" or "to" value can be assigned "not applicable" or the like.

The present invention is not restricted to this type of representation of a relationship. The above representation is provided solely as an illustrative example.

Other types of assets and relationships may also exist in a communication network or other system for which risk is to be assessed. The present invention is in no way limited to the particular assets and relationships shown in FIG. 5. Risk propagation and customizable risk calculation may be applied to other assets associated with a communication network, for example. Different stakeholders or users/owners may have different risk assessment goals, and may thus model or configure assets in different ways.

Whereas one user/owner may be interested only in assessing risk for communication equipment in a communication network, another user/owner may wish to conduct a more detailed analysis of all assets associated with a communication network. In this example, the first user/owner might model only communication equipment and their operating systems, and the second user/owner might model sub-components of communication equipment, including power supplies, buildings in which communication equipment is housed, and other assets which are associated with a communication network but might not strictly be part of the communication network.

By determining relationships between assets associated with a communication network, a security risk analysis system or method may propagate the effects of vulnerabilities between related assets.

The type of propagation between assets may be dependent upon the relationship between those assets. For example, a depends-on relationship between A and B might indicate that asset A's availability depends-on asset B's availability, but in the case of a cable-to relationship, this might not be so. In the latter case, just because asset A is made unavailable does not necessarily mean that asset B is unavailable. One example of this scenario would be two PCs connected to a network.

The risk analyzer 76 (FIG. 3), for example, may determine a vulnerability affecting an asset associated with a communication network, and propagate the effect(s) of the vulnerability from the asset to another asset which has a relationship with the asset. This propagation, and propagation in the reverse direction, may be applied between an asset and each other asset having a relationship with that asset.

In some embodiments, a risk analyzer also determines a security risk to the asset, and/or to the network, its services, and other network features, based on the vulnerabilities affecting the asset and the vulnerabilities propagated to the asset from the other assets.

Figure 6:
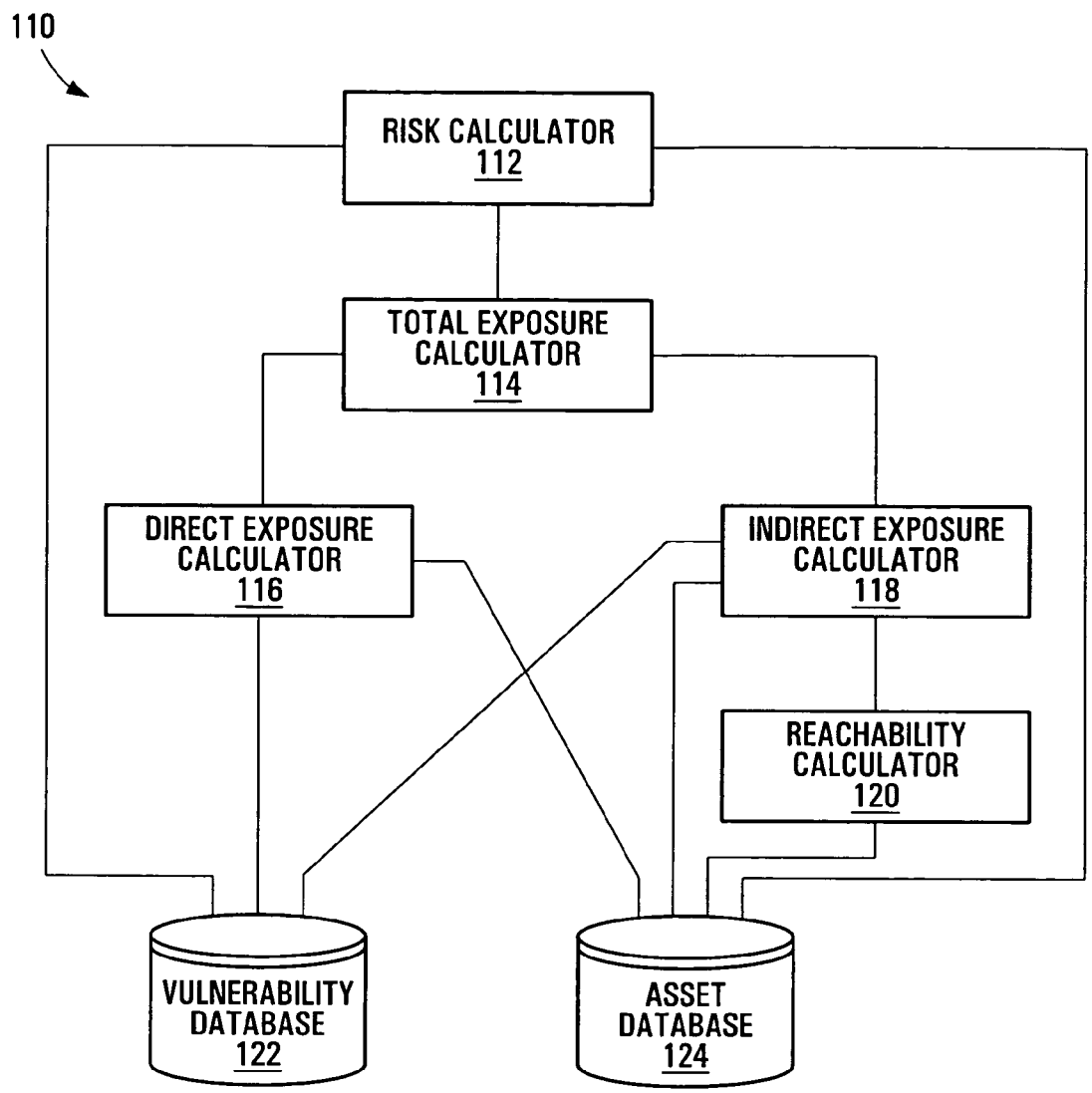
FIG. 6 is a block diagram of a risk calculation system.

FIG. 6 is a block diagram of a risk calculation system, which may be implemented in the risk analyzer 76 of FIG. 3, for example. The risk calculation system 110 includes a risk calculator 112, a total exposure calculator 114 operatively coupled to the risk calculator 112, a direct exposure calculator 116 operatively coupled to the total exposure calculator 114, a vulnerability database 122 operatively coupled to the risk calculator 112, to the direct exposure calculator 116, and to an indirect exposure calculator 118 which is also operatively coupled to the total exposure calculator 114, a reachability calculator 120 operatively coupled to the indirect exposure calculator 118, and an asset database 124 operatively coupled to the risk calculator 112, to the direct exposure calculator 116, to the indirect exposure calculator 118, and to the reachability calculator 120.

The calculators 112, 114, 116, 118, 120 may be implemented, for example, in software which is executed by a processor, although hardware-based embodiments and embodiments in which calculation functions are implemented using some combination of hardware and software are also contemplated.

The risk calculator 112 uses exposure and asset information to calculate a security risk to an asset, network service, or some other selected network feature. Exposure is a mapping between an given asset and the vulnerabilities which affect the asset. As noted above, a vulnerability is a condition in an asset's operation which makes it susceptible to an attack or failure. Other information, such as a threat value, may also be used by the risk calculator 112 in calculating risk. A threat value, which may be entered for an asset by a user for instance, is an indication that an asset may be harmed. For example, a PC which is not connected to a network and is in a highly guarded room might be tagged with a lower threat value than network-connected PCs even if there were several vulnerabilities in the software running on it.

An output of the risk calculator 112 is preferably multi-dimensional in nature. As network complexity increases with devices providing respective specific services, determined risk preferably reflects multiple facets of security, such as Confidentiality, Integrity, and Availability (C, I, A).

The security dimension(s) included in an output provided by the risk calculator 112 may be predetermined or configured by a user/owner through the configuration interface 64 (FIG. 3), for example. A user/owner might wish to evaluate security risk to a service which affects the service's availability. In this case, risk calculator 112 provides an output indicating the security risk to availability of the selected service.

According to one embodiment, security dimension information is provided in numeric format, as a number between 0 and 1 inclusive, indicating the level of importance or relevance of a security dimension to an asset, service, or other network feature. A triplet (1, 0, 0), for example, may be used to indicate a confidentiality risk, or as described below, that an asset has value for providing confidentiality in the network. It should be appreciated, however, that other indications may be used for security dimensions, such as indications of severity or importance of a risk, vulnerability, or asset with respect to each security dimension. The triplet (0.75, 0.50, 0.25), for instance, provides an indication that the C, I, A parameters have different levels of importance.

In the system 110, exposure may be calculated by the total exposure calculator 114 as a function of either or both of direct exposure and indirect exposure. Direct exposure is determined by the direct exposure calculator 116 based on vulnerabilities which directly affect an asset. The indirect exposure calculator 118 calculates a different type of exposure, indirect exposure, which propagates to an asset from related assets. For example, the effects of vulnerabilities associated with an operating system can propagate to any of its applications. In FIG. 5, the effects of vulnerabilities affecting the operating systems 102, 104 can propagate to the server 106 and the database 108, respectively. The indirect exposure calculator 118 uses information on relationships, assets, and reachability in its determination of indirect exposure to risks.

Reachability is determined by the reachability calculator 120 based on relationship and asset information. The reachability calculator 120 implements a function to calculate the exposure of a path between assets in the network. For example, the server 106 in FIG. 5 relies on physical connectivity between itself and the database 108 through the PC 101 and the workstation 103. The exposure to this connectivity is referred to herein primarily as "reachability".

The calculators in the system 110 may access the databases 112, 124 to obtain information on vulnerabilities and assets, and/or obtain information output from other calculators for use in further calculations, as in the case of the risk calculator 112 and the total exposure calculator 114.

According to one embodiment, this set of calculators can be flexibly applied to risk calculations. Different user/owners or missions (business, government, military, and public for instance) may have different requirements or risk assessment scenarios.

The risk calculator 112, for example, which is operatively coupled to the direct and indirect exposure calculators 116, 118 through the total exposure calculator 114, may thus determine a security risk based on exposures determined by particular calculators selected for a current risk analysis operation. For example, a user might select a direct exposure analysis, in which case the direct exposure calculator 116 is selected.

Selection of calculators for a security risk analysis operation may be effected by explicitly selecting particular calculators or particular types of exposure to be analyzed, for instance, such as by entering risk analysis configuration information through a user interface. Calculator selection may also or instead be inherent in a type of risk analysis being performed. In one example, a network-wide risk assessment automatically causes all exposure calculators to be selected, whereas more targeted risk assessments may cause respective subsets of calculators to be selected. Other selection mechanisms are also contemplated, and may be apparent to those skilled in the art.

The effects of selection of a calculator may also be implementation-dependent. In some embodiments, a calculator is operative to calculate its corresponding type of exposure only if it is selected for a current risk analysis operation. Another possible implementation may have calculators which determine their corresponding types of exposure during every risk analysis operation, with another component, the total exposure calculator 114, for example, selecting one or more of the different types of exposure to include in total exposure calculations.

It should be appreciated that not every calculator need necessarily be selectable. According to one possible embodiment, a default or base calculator, illustratively the direct exposure calculator 116, is always automatically selected and used in every risk analysis operation. In this case, the indirect exposure calculator 118 may be selectable to provide for flexibility in risk analysis.

Additional behavior-based components may also be combined with these calculators in a risk calculation system. A traversal agent or function may be used to determine the optimal order in which to process assets associated with a network during risk assessment.

In some embodiments, each asset is processed sequentially with no regard for topology. In others, assets might be processed in an order which is based on a more sophisticated algorithm which sequentially select assets based on, for example, asset relationships and asset paths, and/or attack paths. Risk propagation characteristics might also or instead be taken into account in determining a traversal order. A risk propagation characteristic could be used restrict risk propagation to a maximum of two relationships for instance. In this case, assets which are more than two relationships away from an asset will see no effect of risk to that asset. The particular traversal order algorithm used during an analysis operation may be predetermined, or selectable or otherwise configurable by a user.

Another possible behavioral component is an asset vulnerability builder, which builds associations between vulnerabilities and assets. This component, with which the exposure calculators 116, 118 may interact to determine direct and indirect exposures, maps vulnerabilities to assets which they affect. The direct exposure calculator 116 calculates direct risk based on these mappings. Through relationships, the indirect exposure calculator 118 can determine which vulnerabilities, mapped to an asset by the asset vulnerability builder, propagate to other assets.

In some embodiments, the exposure calculators 116, 118 themselves map vulnerabilities to assets instead of using a separate asset vulnerability builder.

Asset to vulnerability mapping builds associations between assets of a network and known vulnerabilities. The asset and vulnerability databases 122, 124 store asset and vulnerability information which is accessed and processed to build these associations.

According to one embodiment of the invention, the mapping process involves, for a specific asset, comparing asset information against an exploited resource. A resource may be a particular platform, identified in the asset and vulnerability databases by a name and version number. Other asset and vulnerability information may also be processed during asset to vulnerability matching. A platform vulnerability, as well as other types of vulnerabilities, may have other requirements such as a particular access mechanism which must be used to exploit the vulnerability. In this case, access mechanisms for the asset are compared to access mechanisms required by the vulnerability.

If the asset information matches the vulnerability information, then an association is created between the vulnerability and the asset. In the above example, an association would be created in the event of a match between asset and vulnerability platform names, platform versions, and access mechanisms. An association between an asset and a vulnerability may be created, for example, by storing an identifier of an affected asset with a vulnerability in the vulnerability database 122, storing an identifier of the vulnerability with the affected asset in the asset database 124, or storing identifiers of the affected asset and the vulnerability in a separate asset vulnerability table.

For other assets, asset relationships may be searched to determine whether each other asset has a relationship with the asset which is directly affected by the vulnerability. An association is made between the vulnerability and each other asset having a relationship with the directly affected asset. The depth and type of the relationship search may be user-specified, for example.

The above operations may be repeated for all vulnerabilities in the vulnerability database 122, and for all assets in the asset database 124.

The process of determining vulnerabilities which affect an asset may be facilitated by particular data structures used to store vulnerability and asset data. FIGS. 7A and 7B are block diagrams of vulnerability and asset data structures, respectively. Vulnerability and asset databases may include multiple records having the structures shown in FIGS. 7A and 7B.

As shown in FIG. 7A, a vulnerability data structure 130 used to store vulnerability information in a vulnerability database may include a vulnerability identifier 132 and a vulnerability description 134. The identifier 132 identifies a vulnerability, as an operating system name and version number for instance, and the description 134 defines aspects of the vulnerability such as its effect, illustratively as a numeric triplet in terms of the above (C, I, A) security dimensions, conditions such as an access mechanism which are required for the vulnerability to be exploited, etc.

The content of the data fields 132, 134 may differ between risk analysis implementations. The invention is in no way limited to any particular scheme for specifying vulnerabilities. For example, vulnerabilities may be specified according to Application Vulnerability Definition Language (AVDL), Common Vulnerabilities and Exposures (CVE), or Common Vulnerability Scoring System (CVSS). Further vulnerability information options are also possible, and may be apparent to those skilled in the art.

The asset data structure 140 of FIG. 7B includes an asset identifier 142, an asset type 144, an asset value 146, and an asset profile 148. The identifier 142 uniquely identifies the asset using a user-defined name for instance. The asset type field 144 may indicate the type of asset, as a physical or logical asset as described above, and/or provide more detail as to the nature of the asset, such as any service or mission to which the asset is critical or important. The asset value 146 indicates one or more values of the asset, such as a value in terms of (C, I, A) security dimension and/or a dollar value.

The asset profile 148 includes information used in mapping vulnerabilities to assets. In the above example of an operating system vulnerability identified in the data structure 130 (FIG. 7A) by its name and version, the asset profile 148 of a PC may identify the name and version of the PC's operating system, and the vulnerability may thereby be mapped to the assets it affects by matching vulnerability identifiers with asset profiles. Access mechanisms which are available for accessing an asset may also be indicated in the asset profile 148 for use in mapping vulnerabilities requiring particular access mechanisms to assets.

It should also be appreciated that assets and vulnerabilities may be matched in the opposite direction, in that information associated with an asset may be used to identify vulnerabilities which affect that asset.

Vulnerabilities and assets which are to be included in a risk assessment may similarly be identified by a risk analyzer by accessing information in the data structures 130, 140. With reference to FIG. 3, suppose a user/owner selects through the configuration interface 64 a confidentiality (C) risk assessment. In this case, the risk analyzer 76 accesses the databases 82, 84 to identify vulnerabilities which affect confidentiality and possibly assets which are valuable for maintaining confidentiality in the network.

Information associated with relationships between an asset and other assets may also be included in the asset profile 148, in the form of a type of relationship and an asset identifier for each relationship.

FIG. 7C is a block diagram of an illustrative example security state data structure 135. As shown, the security state data structure 135 includes an asset or feature identifier 141, and security state information including direct exposure information 143, indirect exposure information 145, total exposure information 147, and risk information 149.

The identifier 141 identifies an asset or feature of a communication network, in terms of a user-defined name for instance. The fields 143, 145, 147, 149 store security state information, preferably including exposure and risk values calculated by the calculators 112, 114, 116, 118 (FIG. 6). Any or all of these values may be expressed as values of the above (C, I, A) security dimensions.

It should be appreciated that the fields 143, 145, 147, 149 may also store other exposure or risk information, such as an identifier of another asset, a relationship type, and a propagated vulnerability in the case of the indirect exposure information 145, for example.

Other variations of the data structure 135 include providing multiple exposure fields for direct and indirect exposures of an asset or feature. A separate field might be provided for each vulnerability which directly or indirectly affects an asset, for example.

The data structure 135 may be used for storage of data in the security state database 86 (FIG. 3), for example. In another embodiment, exposure and risk information is added to asset records in an asset database, in which case any or all of the exposure and risk fields 143, 145, 147, 149 may be included in the asset data structure 140, possibly as part of the asset profile 148.

The data structures 130, 140, 135 are illustrative examples of data structures which may be used to store vulnerability, asset, and security state information. Different data structures, including additional or different information, may be used in other embodiments.

Figure 8:
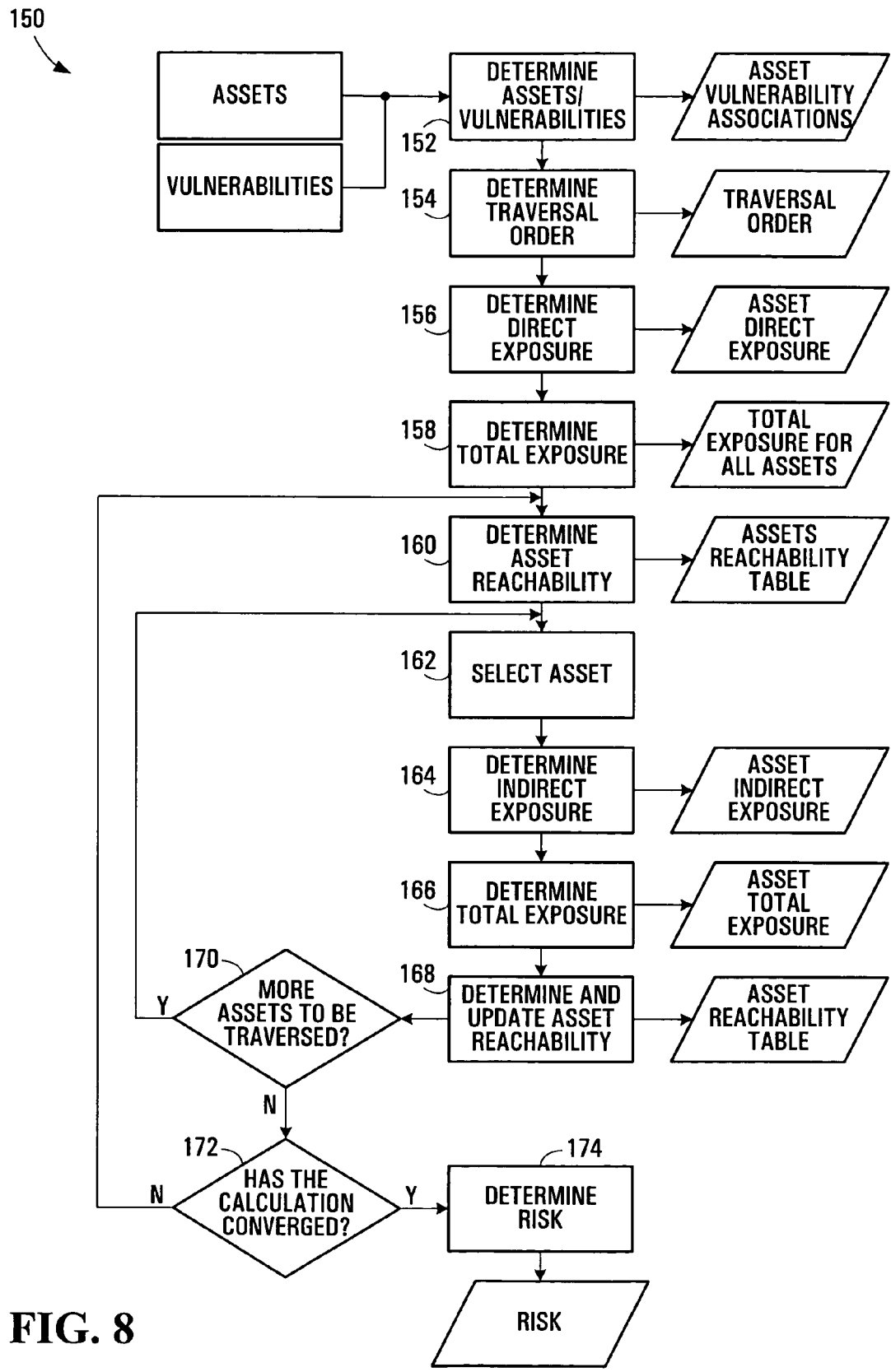
FIG. 8 is a flow diagram illustrating a risk calculation method.

FIG. 8 is a flow diagram illustrating a risk calculation method. In FIG. 8, operations in the method are labelled with reference numbers, and outputs of the various operations are shown adjacent to the labelled operation blocks. The operation of the calculators shown in FIG. 6 according to embodiments of the invention will also become apparent from FIG. 8 and the description thereof.

The method 150 begins at 152 with an operation of determining assets and vulnerabilities, by an asset vulnerability builder as described above for instance, to generate asset vulnerability associations. This determination may involve simply retrieving stored asset and vulnerability information, or in some embodiments processing information to calculate asset and vulnerability information, which is then compared to map or associate assets and vulnerabilities.

At 154, the traversal order for processing assets is determined. Direct exposures of the assets, in the traversal order, are then determined at 156 using the asset/vulnerability associations.

Direct exposure may be determined at 154 in (C, I, A) terms. In this case, each vulnerability has a (C, I, A) value which represents the effect that the vulnerability would have on an asset. A rule set is used in some embodiments to determine how final direct exposure values are calculated. For example, direct exposure for an asset could be generated using the sum of the (C, I, A) values of all of the vulnerabilities which directly affect, as indicated in the asset vulnerability associations determined at 152. Other possible direct exposure calculation rules may specify that a maximum value of the vulnerabilities or a maximum value of each security dimension is to be chosen as a final direct exposure value. The rule or rules used for direct exposure calculation may be predetermined or user-selected.

It should be appreciated that further options are also possible for determining final direct exposures. For example, a direct exposure calculator may take additional information into account, such as a user-entered or otherwise provided indication of attacker expertise.

Total exposure is determined at 158, although in this case only direct exposure has been determined at 156 and thus total exposure is the same as the direct exposure.

In one embodiment, the operations at 152 through 158 initialize software-based calculators and data, specifically direct and total exposure for all assets, which may be used in subsequent risk analysis. However, it should be appreciated that a user/owner may configure a risk analysis system such that only direct vulnerabilities are analyzed. In this case, direct exposure may be determined at 156 for all assets, or for only certain assets which are associated with a particular service, mission, and/or security dimension. The determination of total exposure at 158 may still be performed in this case, even though total exposure would be the same as direct exposure. This may important, for example, in a software-based embodiment in which a risk calculator is configured to determine a security risk based on a total exposure variable.

The method 150 then transitions into an indirect exposure phase, if risk analysis is to take indirect exposures into account, and continues at 160 with an operation of determining reachability for assets.

As described above, assets may have relationships such as "depends-on" relationships between them. For example, a web server A might depend on a database server B. In this case, A's functionality relies on B functioning correctly and being reachable through the network. To determine reachability, other assets in the network, as well as "cabled-to" and "runs-on" relationships between A and B, are taken into account.

The exposure of the path between these assets is determined, illustratively using some form of a Dijkstra algorithm or an algorithm based on Open Shortest Path First (OSPF), and exposures for each of the assets in the path between two endpoint assets. The output of this algorithm is a reachability value, shown in FIG. 8 as a reachability table which contains that total exposure for each connected pair of assets.

An asset is selected at 162, in the traversal order determined at 154 or possibly in a different order, and its indirect exposure is determined at 164 based on its reachability and relationships.

Indirect exposure represents exposure of an asset to risks or vulnerabilities of other assets through its relationships. The determination of indirect exposure may involve traversing an entire list of relationships associated with the asset and evaluating whether each of those relationships have been fulfilled, that is, associated with one or more other assets.

When one asset depends on another, it also implies that the depended-on asset is reachable through the network. A risk to the reachability of each asset may thus be factored into the indirect exposure calculation.

A rule set may be used to determine the how indirect exposure values are calculated based on asset types and relationships. For example, an operating system asset might treat a depends-on relationship differently than a router asset would.

For each relationship evaluation, there may be several attributes to take into account, including the types of the assets at the endpoints of the relationship, the direct exposure values of those assets, a scaling factor associated with the relationship, and the exposure value for the path between those assets.

The reachability exposure of the endpoints of the relationship may be evaluated using the reachability table described above. This represents the exposure value for the path between the assets.

Using the parameters contained in the indirect exposure rule set, an evaluation of the exposure from each relationship is calculated. For example, the path exposure and the endpoint exposure could be combined and then multiplied by the relationship scaling factor to determine the indirect exposure for a single relationship. These operations are repeated for each relationship associated with the asset.

Once all relationship exposures have been determined, indirect exposure is determined based on the relationship exposures. For example, the relationship exposures could be summed, or a maximum relationship exposure or maximum of each security dimension could be selected, to determine the final indirect exposure. Other algorithms may also or instead be used to determine indirect exposure.

Total exposure for the asset, including its direct exposure as determined at 154, and its indirect exposure as determined at 164, is determined at 166. As for the direct and indirect exposures described above, a rule set may be used to define how total exposure is determined. For example, a rule set might specify that 75% of total exposure is to come from direct exposure and 25% is to come from indirect exposure. Total exposure calculation might also or instead vary depending on the type of asset to which it is being applied, to provide different total exposure calculation schemes for an operating system and a hardware platform for instance.

As the total exposure of other assets with relationships to an asset may affect its reachability, the reachability of the asset may again be determined at 168 to update the asset reachability table. For example, a PC which connects to a network through a router may have a high exposure to the router's availability. Thus, the PC could be less reachable depending on the total exposure of the router.

As shown at 170, the operations at 162 through 168 are repeated for all assets to be analyzed. This may include all assets when a comprehensive network analysis is being performed, or only certain assets when a more targeted analysis, for particular assets or groups of assets or a particular service, mission, or security dimension for instance, is being conducted.

In some embodiments, steps 160-168 are iterated until either exposure calculations converge, as shown at 172, or some predetermined number of iterations have been completed.

An estimate of security risk is then determined at 174 using the total exposure and an indication of security risk is provided.

Risk calculation, like exposure calculation, may be controlled by a rule set. A relatively simple risk calculator might implement a multiplication rule in which exposure and asset values are multiplied. Where (C, I, A) values are used, this type of scheme effectively accounts for differences in asset and exposure security parameters. For example, an exposure value of (1, 0, 0) generates a risk value of (1, 0, 0) only if the asset value also has a confidentiality parameter of 1. Thus, a confidentiality exposure results in a confidentiality risk only if an asset has value for the purposes of confidentiality. A confidentiality exposure would not result in any risk to an asset which has value only for integrity and/or availability.

A determination of risk may also involve processing further information, such as a user-entered threat value. In the case of a "multiply" risk calculation rule, a threat value might scale the product of exposure and asset values.

Figure 9:
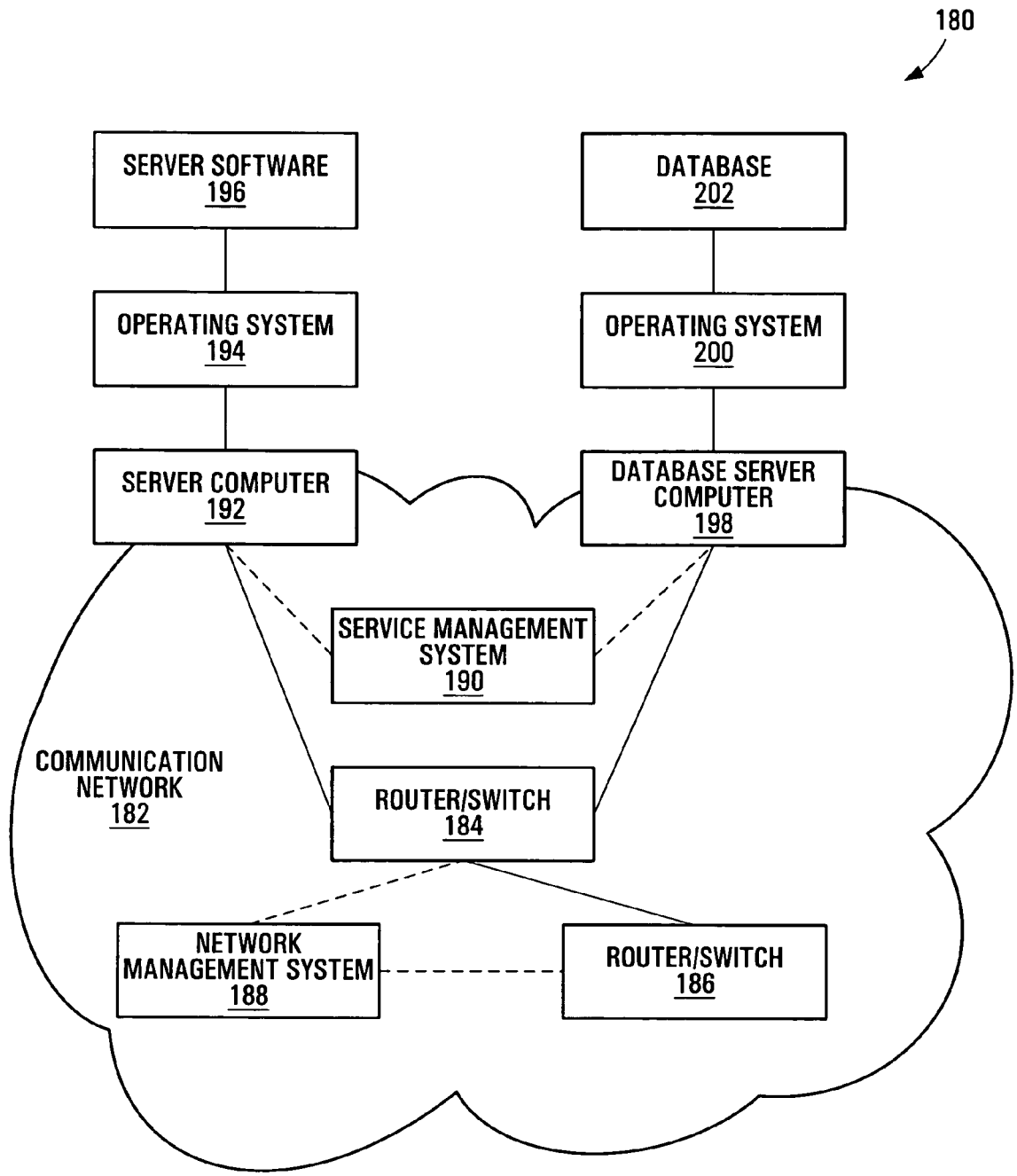
FIG. 9 is a block diagram of a communication network in conjunction with which embodiments of the invention may be implemented.

FIG. 9 is a block diagram of a communication network in conjunction with which embodiments of the invention may be implemented. The communication network 182 in FIG. 9 includes routers/switches 184, 186 through which communication links may be established, a network management system 188 for managing the router/switch modules 184, 186, a server computer 192 and a database server computer 198 which communicate through the router/switch 184, and a service management system 190 which manages a service provided by the server computer 192 and the database server computer 198.

The server computer 192 and the database server computer 198 are examples of the PC and workstation shown in FIG. 5. These computers, along with their operating systems 194, 200 and server and database application software 196, 202, cooperate to provide a database access service such as an inventory service.

The types of equipment which might be implemented as the routers/switches 184, 186, the server computers 192, 198, and the management systems 188, 190, as well as other equipment which may be provided in the communication network 182, will be apparent to those skilled in the art. The present invention is in no way restricted to any specific types of equipment or other communication network assets. Although not explicitly shown in FIG. 9, other assets associate with the communication network 182, including buildings in which communication equipment or other assets are housed, may also be included in a communication network risk analysis model.

Embodiments of the invention as disclosed herein would be useful in the network management system 188 for assessing risks to assets in the communication network 182. The service management system 190 is an example of another type of system in which embodiments of the invention may be useful, to manage risks to the server computers 192, 198 and other assets which are involved in providing a service.

A risk analyzer could be implemented as an extension to existing network and service management systems to provide current security status information of a network and/or service. Considering a telecommunications service provider for instance, embodiments of the present invention would complement an Operation Support System (OSS) and could be integrated in a Security Operation Center (SOC) next to a Network Operation Center (NOC). For OSS software vendors, the risk analysis and management techniques disclosed herein offer an opportunity to provide a specific security extension which could be offered as a customization added component.

Flexible security risk management and assessment for network and service operators and other communication network stakeholders have been disclosed. The flexible security model as disclosed herein may be configured to reflect network and business priorities, for example. Risk analysis may also be customized based on specific network, service, and other dependencies.

What has been described is merely illustrative of the application of principles of the invention. Other arrangements and methods can be implemented by those skilled in the art without departing from the scope of the present invention.

Although described primarily in the context of methods and systems, other implementations of the invention are also contemplated, illustratively as instructions stored on a machine-readable medium for example.

We claim:

1. A risk analysis system comprising:
   a risk analyzer configured to determine a consolidated security risk to a feature of a communication network by analyzing assets of the communication network which are associated with the communication network feature and vulnerabilities affecting the assets which are associated with the communication network feature and calculating the consolidated security risk to the communication network feature based on the vulnerabilities, the consolidated security risk being in addition to any security risks calculated for the assets based on the vulnerabilities; and
   a user interface operatively coupled to the risk analyzer.

2. The risk analysis system of claim 1, wherein the assets comprise one or more of: physical assets and logical assets.

3. The risk analysis system of claim 2, wherein the physical assets comprise equipment in the communication network.

4. The risk analysis system of claim 2, wherein the logical assets comprise one or more of: software for execution by processors in the communication network and information stored by equipment in the communication network.

5. The risk analysis system of claim 1, further comprising one or more of:
   an event manager configured to receive information associated with vulnerabilities and assets, and to update current vulnerabilities and assets based on the received information;
   a network model manager configured to capture a representation of the communication network and the determined consolidated security risk; and
   a report manager configured to receive through the user interface risk report selection inputs and to generate a report of the determined consolidated security risk in accordance with the received selection inputs.

6. The risk analysis system of claim 1, wherein the user interface comprises one or more of:
   a simulation interface configured to receive information associated with temporary changes to the vulnerabilities, assets, or both;
   a configuration interface configured to receive one or more of network configuration information associated with vulnerabilities, assets, or both, and risk analysis configuration information for configuring an analysis process applied to the vulnerabilities and assets by the risk analyzer;
   a network map configured to present a representation of the communication network and the determined consolidated security risk; and
   a report interface configured to receive risk report selection inputs for configuring a report of the determined consolidated security risk.

7. The risk analysis system of claim 1, further comprising:
   a data system configured to provide access to risk exposure management information.

8. The risk analysis system of claim 1, wherein the risk analyzer is further configured to determine the consolidated security risk by analyzing vulnerabilities which affect the communication network feature.

9. The risk analysis system of claim 8, wherein the risk analyzer comprises:
   a direct exposure calculator configured to determine a direct exposure risk to the communication network feature based on the vulnerabilities which affect the communication network feature;
an indirect exposure calculator configured to determine an indirect exposure risk to the communication network feature based on the vulnerabilities affecting the assets which are associated with the communication network feature;
a total exposure calculator configured to determine a total exposure risk to the communication network feature as a function of the direct exposure risk and the indirect exposure risk; and
a risk calculator configured to determine the consolidated security risk to the communication network feature based on the total exposure risk.

10. The risk analysis system of claim 9, wherein the vulnerabilities affecting the assets which are associated with the communication network feature are determined in a sequence according to a traversal order of the assets.

11. The risk analysis system of claim 1, wherein the user interface is configured to receive from a user risk analysis configuration information specifying the communication network feature.

12. The risk analysis system of claim 11, wherein the risk analyzer is further configured to provide through the user interface an indication of the determined consolidated security risk.

13. The risk analysis system of claim 7, wherein the data system is configured to provide access to one or more of:
a vulnerabilities database configured to store information associated with the vulnerabilities;
an asset database configured to store information associated with the assets;
a security state database configured to store information associated with the determined consolidated security risk; and
a user interface database configured to store information associated with the user interface.

14. A communication network security risk analysis method comprising:
providing vulnerabilities affecting assets of a communication network; and
determining a consolidated security risk to a feature of a communication network by analyzing the assets which are associated with the communication network feature and the vulnerabilities affecting the assets which are associated with the communication network feature and calculating the consolidated security risk to the feature based on the vulnerabilities, the consolidated security risk being in addition to any security risks calculated for the assets based on the vulnerabilities,
wherein the assets comprise one or more of:
physical assets comprising equipment in the communication network; and
logical assets comprising one or more of: software for execution by processors in the communication network and information stored by equipment in the communication network.

15. The method of claim 14, further comprising:
providing an indication of the determined consolidated security risk.

16. The method of claim 14, further comprising:
receiving information associated with vulnerabilities and assets;
updating current vulnerabilities and assets based on the received information.

17. The method of claim 14, further comprising:
receiving risk analysis configuration information; and
adapting an analysis process applied to the vulnerabilities and assets in accordance with the received risk analysis configuration information.

18. A machine-readable medium storing instructions which when executed perform the method of claim 14.

19. The method of claim 14, further comprising:
providing vulnerabilities which affect the feature of the communication network,
wherein determining further comprises determining the consolidated security risk by analyzing the vulnerabilities which affect the feature of the communication network.

20. A machine-readable medium storing instructions which when executed perform the method of claim 19.

* * * * *

UNITED STATES PATENT AND TRADEMARK OFFICE
CERTIFICATE OF CORRECTION

PATENT NO. : 7,743,421 B2 Page 1 of 1
APPLICATION NO. : 11/132118
DATED : June 22, 2010
INVENTOR(S) : Francois Cosquer et al.

It is certified that error appears in the above-identified patent and that said Letters Patent is hereby corrected as shown below:

Title Page, Item (75) Inventors:

"Francois J.N. Cosquer, Orgeval (CA)" should be --Francois Cosquer, Orgeval (FR)--;

"Bertrand Marquet, Le Plessis Robinson (CA)" should be --Bertrand Marquet, Le Plessis Robinson (FR)--; and "Scott David D'Souza, Ottawa (CA)" should be --Scott David D'Souza, Stittsville (CA)--.

Signed and Sealed this

Tenth Day of August, 2010

David J. Kappos
*Director of the United States Patent and Trademark Office*